US011551255B2

(12) United States Patent
Balsavias et al.

(10) Patent No.: US 11,551,255 B2
(45) Date of Patent: Jan. 10, 2023

(54) SYSTEM AND METHOD FOR PROCESSING DIGITAL COUPONS

(71) Applicant: Mastercard International International, Purchase, NY (US)

(72) Inventors: Peter Balsavias, St. Louis, MO (US); Samantha L. Jones, Falls Church, VA (US); Patricia E. Littler, London (GB); Jenna L. Kanterman, Arlington, VA (US); Caroline M. Ginty, Santa Monica, CA (US); Emma Goodyear, Coedpoeth (GB); Emilie M. Kroner, Cincinnati, OH (US); John Hutchison, Cold Spring, NY (US); Joan L. Rohlfing, O'Fallon, MO (US)

(73) Assignee: Mastercard International International, Purchase, NY (US)

( * ) Notice: Subject to any disclaimer, the term of this patent is extended or adjusted under 35 U.S.C. 154(b) by 0 days.

(21) Appl. No.: 17/407,414

(22) Filed: Aug. 20, 2021

(65) Prior Publication Data

US 2022/0058684 A1 Feb. 24, 2022

Related U.S. Application Data

(60) Provisional application No. 63/068,754, filed on Aug. 21, 2020.

(51) Int. Cl.
*G06Q 30/02* (2012.01)
*G06Q 20/34* (2012.01)
*G06Q 20/28* (2012.01)

(52) U.S. Cl.
CPC ........ *G06Q 30/0238* (2013.01); *G06Q 20/28* (2013.01); *G06Q 20/347* (2013.01); *G06Q 30/0208* (2013.01); *G06Q 30/0225* (2013.01)

(58) Field of Classification Search
CPC .......... G06Q 30/0238; G06Q 30/0208; G06Q 30/0225
See application file for complete search history.

(56) References Cited

U.S. PATENT DOCUMENTS 10,929,840 B1 * 2/2021 Ramanathan ........ G06Q 20/322
2005/0222910 A1 * 10/2005 Wills .................... G06Q 30/02
705/22

(Continued)

FOREIGN PATENT DOCUMENTS

| JP | 2020052805 | 4/2020 | |
|---|---|---|---|
| KR | 101020562 | 3/2011 | |
| WO | WO-2015008084 A1 * | 1/2015 | ........... G06Q 20/387 |

OTHER PUBLICATIONS

"Why are Travel Management Companies (TMCs) Switching to Virtual Payments?" (published on May 23, 2017 at https://www.wexinc.com/insights/blog/wex-travel/tmcs-switching-virtual-payments/) (Year: 2017).*

(Continued)

*Primary Examiner* — James M Detweiler
(74) *Attorney, Agent, or Firm* — Hovey Williams LLP

(57) ABSTRACT

A computer system includes a processor, a communication interface, and a database. The communication interface is configured to receive, from a computing device, a coupon request message, wherein the message includes a first unique coupon program ID. The processor is programmed with computer-executable instructions that cause the processor to extract, from the coupon request message, the first unique coupon program ID. In addition, the processor matches the first unique coupon program ID to a second unique coupon program ID stored in the database. Furthermore, the processor generates, by a token service system, a digital coupon token. The digital coupon token is associated with the first and second unique coupon program IDs.

(Continued)

Moreover, the processor is programmed to transmit the digital coupon token to the computing device.

20 Claims, 7 Drawing Sheets

(56) References Cited

U.S. PATENT DOCUMENTS

| | | | |
|---|---|---|---|
| 2009/0144164 A1* | 6/2009 | Wane | G06Q 20/10 235/383 |
| 2011/0302018 A1 | 12/2011 | Norcross et al. | |
| 2012/0271697 A1* | 10/2012 | Gilman | G06Q 20/387 705/26.35 |
| 2013/0103482 A1 | 4/2013 | Song et al. | |
| 2013/0144700 A1* | 6/2013 | VanDeburg | G06Q 30/0225 705/14.23 |
| 2014/0278881 A1* | 9/2014 | Mann | G06Q 30/0207 705/14.26 |
| 2015/0347722 A1 | 12/2015 | Baumgartner et al. | |

OTHER PUBLICATIONS

International Search Report and Written Opinion for PCT Application No. PCT/US2021/046840 entitled System and Method for Processing Digital Coupons (dated Dec. 15, 2021).

\* cited by examiner

SYSTEM AND METHOD FOR PROCESSING DIGITAL COUPONS

CROSS-REFERENCE TO RELATED APPLICATIONS

This application claims the priority benefit of identically-titled U.S. Provisional Patent Application Ser. No. 63/068,754 filed Aug. 21, 2020, the entire disclosure of which is incorporated herein by reference.

FIELD OF THE DISCLOSURE

The field of the disclosure relates generally to coupon systems, and more particularly, to a stored value coupon scheme where a coupon is tokenized and processed electronically.

BACKGROUND

Coupons are used to attract consumers to merchants and influence spending. Merchants often use coupons to lure consumers to visit a physical location, and sometimes will provide additional coupons to a consumer after a transaction in order to encourage repeat business. However, merchants lack necessary technology for validating coupons and/or detecting fraudulent coupons.

Coupon fraud occurs whenever someone intentionally uses a coupon for a product that he/she has not purchased or otherwise fails to satisfy the terms and conditions for redemption. In addition, coupon fraud occurs when coupons are altered/counterfeited. The current coupon ecosystem relies primarily on manual validations of the coupons by comparing the coupons to a file of fraudulent coupons. Manual validation of coupons is prone to error, labor intensive, inefficient, and cost intensive. A fragmented ecosystem, poor standards, antiquated systems, and lack of innovation have created an inefficient coupon market with no single trusted party, and limited controls for fraud.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer system is provided. The computer system includes a database, a communication interface, and a processor. The communication interface receives, from a user computing device, a coupon request message. The coupon request message includes a first unique coupon program ID. The processor is programmed to perform operations including extracting, from the coupon request message, the first unique coupon program ID, and matching the first unique coupon program ID to a second unique coupon program ID stored in the database. Furthermore, the processor is programmed to perform an operation of generating, by a token service system, a digital coupon token. The digital coupon token is associated with the first and second unique coupon program IDs. In addition, the processor is programmed to perform an operation of transmitting the digital coupon token to the user computing device.

In another aspect, a computer-implemented method is provided. The method includes the step of receiving, via a communication interface, a coupon request message from a user computing device. The coupon request message includes a first unique coupon program ID. The method also includes the step of extracting, from the coupon request message, the first unique coupon program ID, and matching the first unique coupon program ID to a second unique coupon program ID stored in a database. Furthermore, the method includes the steps of generating, by a token service system, a digital coupon token. The digital coupon token is associated with the first and second unique coupon program IDs. Moreover, the method includes the step of transmitting the digital coupon token to the user computing device.

In yet another aspect, a computer-readable storage medium is provided. The computer-readable storage medium includes computer-executable instructions stored thereon. The computer-executable instructions, when executed by a processor, cause the processor to perform the operation of receiving, via a communication interface, a coupon request message from a user computing device. The coupon request message includes a first unique coupon program ID. In addition, the computer-executable instructions cause the processor to perform the operations of extracting, from the coupon request message, the first unique coupon program ID, and matching the first unique coupon program ID to a second unique coupon program ID stored in a database. Furthermore, the computer-executable instructions cause the processor to perform the operation of generating, by a token service system, a digital coupon token. The digital coupon token is associated with the first and second unique coupon program IDs. Moreover, the computer-executable instructions cause the processor to perform the operation of transmitting the digital coupon token to the user computing device.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
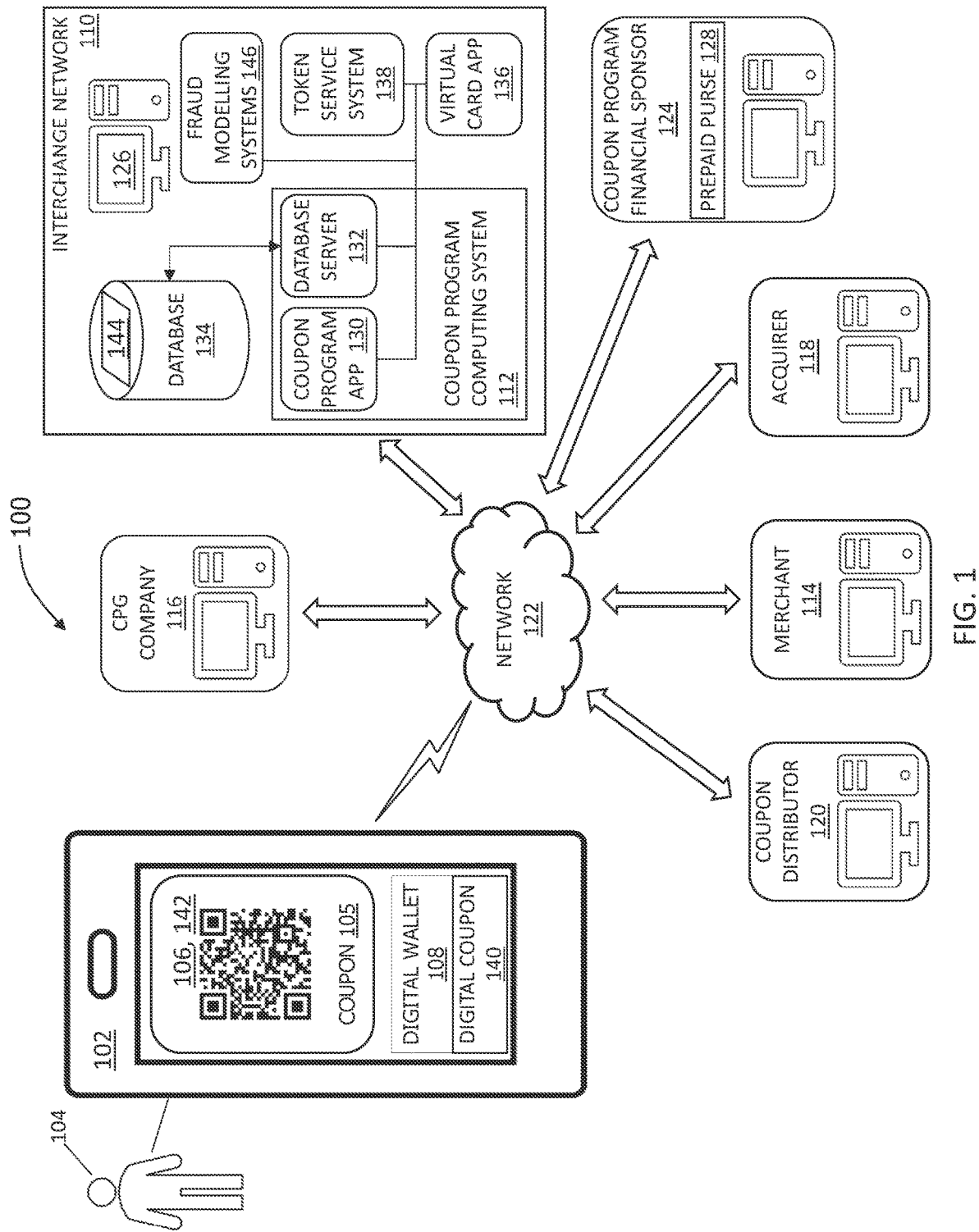
FIG. 1 is a block diagram of an example multi-party network system, including a user computing device, a computing system, and a server system, in accordance with one embodiment of the present disclosure.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

As used herein, the term "database" includes either a body of data, a relational database management system (RDBMS), or both. As used herein, a database includes, for example, and without limitation, a collection of data including hierarchical databases, relational databases, flat file databases, object-relational databases, object oriented databases, and any other structured collection of records or data that is stored in a computer system. Examples of RDBMS's include, for example, and without limitation, Oracle® Database (Oracle is a registered trademark of Oracle Corporation, Redwood Shores, Calif.), MySQL, IBM® DB2 (IBM is a registered trademark of International Business Machines Corporation, Armonk, N.Y.), Microsoft® SQL Server (Microsoft is a registered trademark of Microsoft Corporation, Redmond, Wash.), Sybase® (Sybase is a registered trademark of Sybase, Dublin, Calif.), and PostgreSQL® (PostgreSQL is a registered trademark of PostgreSQL Community Association of Canada, Toronto, Canada). However, any database may be used that enables the systems and methods to operate as described herein.

As used herein, the terms "payment card," "transaction card," and "financial transaction card," may include any suitable transaction card, such as a credit card, a debit card, a charge card, a membership card, a promotional card, an identification card, a prepaid card, a gift card, and/or any other card-type device that may hold payment account information. Each type of transaction card can be used as a method of payment for performing a transaction.

Furthermore, as used herein, the term "real-time" includes at least one of the times of occurrence of the associated events, the time of collection of data, the time to process the data, and the time of a system response to the events and the environment. For the activities and the events in the embodiments described herein as occurring in real-time, it should be assumed that they occur substantially instantaneously.

Exemplary System

FIG. 1 is a block diagram of an example multi-party network system 100, including a user computing device 102 belonging to a user (or consumer) 104, in accordance with one embodiment of the present disclosure. In the exemplary embodiment, the network system 100 provides interchange network services offered by one or more payment networks, such as interchange network 110. In addition, the network system 100 enables payment card transactions in which users 104, coupon offerers/distributers (e.g., consumer packaged goods (CPG) company 116 and coupon distributer 120), and merchants (e.g., merchant 114) do not need to have a one-to-one relationship. Although parts of the network system 100 are presented in one arrangement, other embodiments may include the same or different parts arranged otherwise, depending, for example, on authorization processes for purchase transactions, communication between computing devices, etc.

In the example embodiment, the network system 100 generally includes the user computing device 102, the interchange network 110 including a coupon program computing system 112, the merchant 114, the CPG company 116, an acquirer (or acquiring bank) 118, the coupon distributer 120, and a coupon program financial sponsor 124 coupled in communication via a communications network 122. The network 122 includes, for example and without limitation, one or more of a local area network (LAN), a wide area network (WAN) (e.g., the Internet, etc.), a mobile network, a virtual network, and/or any other suitable public and/or private network capable of facilitating communication among the user computing device 102, the coupon program computing system 112, the interchange network 110, the merchant 114, the CPG company 116, the acquirer 118, the coupon distributer 120, and/or the coupon program financial sponsor 124. In some embodiments, the network 122 includes more than one type of network, such as a private transaction network provided by the interchange network 110 to the CPG company 116, the acquirer 118, and the coupon program financial sponsor 124, and, separately, the public Internet, which may facilitate communication between the user computing device 102, the coupon program computing system 112, the merchant 114, the interchange network 110, etc.

Embodiments described herein relate to transaction card systems, such as a credit card payment system using the Mastercard® interchange network. (Mastercard is a registered trademark of Mastercard International Incorporated.) The Mastercard interchange network is a set of proprietary communications standards promulgated by Mastercard International Incorporated for the exchange of financial transaction data and the settlement of funds between financial institutions that are members of Mastercard International Incorporated.

With continued reference to FIG. 1, in the exemplary embodiment, the user computing device 102 (e.g., a smartphone or other computing device used by the user 104) includes a user interface (not labelled) that facilitates user interaction with the respective user computing device 102. For example, and without limitation, the user interface enables the user 104 to input information to the user computing device 102, and the user computing device 102 to output information to the user 104 (e.g., on a display of the user computing device 102). The user interface includes, for example, a digital wallet application 108 (broadly, a digital wallet), which is installed on the user computing device 102. In the exemplary embodiment, a digital wallet 108 includes digital coupon data (e.g., a digital coupon token 140 (also referred to as a "digital coupon")) associated with the coupon program computing system 112. It is contemplated that fewer or more digital wallets may be installed on the user computing device 102 and displayed by the user interface, where each digital wallet is associated with at least one financial institution (not shown).

In the exemplary embodiment, the user computing device 102 communicates with one or more of the merchant 114, the CPG company 116, and/or the coupon distributer 120, for example, via the network 122. In addition, the user computing device 102 communicates with the coupon program computing system 112, for example, via the network 122, to exchange and/or synchronize the digital coupon data 140 for example, with the user computing device 102 and/or the digital wallet 108. The coupon program computing system 112 accesses the network 122 to communicate with the merchant 114, the CPG company 116, the coupon distributer 120, the acquirer 118, and/or the coupon program financial sponsor 124 to facilitate the establishment of one or more coupon programs, associated digital coupon tokens 140, and the exchange of funds and other financial data between accounts of the merchant 114 and the CPG company 116.

The user computing device 102 can be any computing device capable of interconnecting to the network 122, such as the Internet, including a mobile web-based device, smartphone, PDA, or other mobile web-based connectable equipment. The user computing device 102 is interconnected to the Internet through one or more interfaces including a network, such as a local area network (LAN) or a wide area network (WAN), dial-in-connections, cable modems, wireless modems, and special high-speed ISDN lines. In addition, in the example embodiment, the user computing device 102 is configured to communicate with other user computing devices and/or merchant point-of-sale (POS) systems (not shown) using various forms of communication including, for example, radio frequency communication, near field communication (NFC), network-based communication, and the like.

The network system 100 includes, for example, and without limitation, a computer, a server, a network of multiple computing devices, a virtual computing device, or the like. In addition, in the exemplary embodiment, the network system 100 also includes one or more payment network server systems 126 (also referred to as a payment system), which is part of the interchange network 110 and is coupled in communication to the network 122. The payment system 126 is a computer including, for example, a web application, an application programming interface (API) server, and a memory device, enabling the interchange network 110 to be in communication with the coupon program computing system 112 using, for example, and without limitation, the Internet and/or an internal network.

The payment system 126 is interconnected to the Internet through one or more interfaces including a network, such as a local area network (LAN) or a wide area network (WAN), dial-in-connections, cable modems, and special high-speed ISDN lines. The payment system 126 can be any computing device capable of interconnecting to the Internet. In certain embodiments of the present invention, the coupon program computing system 112 is integrated with or is otherwise a part of the payment network server system 126.

The coupon program computing system 112 includes, for example, a database server 132, which is connected to a database 134. In one embodiment, the database 134 is stored on the coupon program computing system 112 and can be accessed by the user 104, the merchant 114, the CPG company 116, and/or the coupon distributor 120. In an alternative embodiment, the database 134 may be stored remotely from the coupon program computing system 112 and may be non-centralized. The database 134 is configured to receive and store digital coupon data and/or information related to various coupon programs and/or digital coupon data associated with a specific coupon program.

Furthermore, the coupon program computing system 112 includes a coupon program application 130. In the exemplary embodiment, the coupon program application 130 facilitates the creation of a coupon program for the merchant 114 or the CPG company 116, and/or creation of a digital coupon token 140 associated with a coupon program for the user 104. The coupon program application 130 also facilitates settlement of funds, corresponding to a value of one or more digital coupon tokens 140 associated with one or more coupon programs, between the merchant 114 (e.g., via the acquirer 118) and the CPG company 116 (e.g., via the coupon program financial sponsor 124). The transaction, including the associated value of the digital coupon tokens 140 associated with the transaction, is stored in the database 134.

In the exemplary embodiment, the user computing device 102 is used to scan a coupon 105 (e.g., printed or printable coupons, digital coupons, etc.) including a machine-readable code 106, such as a barcode or quick response (QR) code, that represents a unique coupon program identifier (ID) 142, or otherwise input coupon data, such as the unique coupon program ID 142, into the ser computing device 102 and/or the digital wallet 108.

In one embodiment, the machine-readable code 106 is a QR code. A QR code is a two-dimensional barcode or matrix barcode that is defined by the international standard ISO/IEC 18004:2015. A QR code includes three distinctive marks at different corners of the QR code image and one or more smaller marks proximate a fourth corner to normalize the image for size, orientation, and angle of viewing. In addition, dispersed within the four corners of the QR code are a plurality of small dots that can be converted to binary numbers and validated with an error-correcting algorithm. The binary number includes data that is encoded within the QR code. In one suitable embodiment, the data encoded in the QR code includes a coupon program (or campaign) ID, associated data, website address/link, and the like.

While the machine-readable code 106 described herein is in reference to a QR code, the disclosure contemplates that any type of machine-readable code may be used that enables the network system 100 to function as described herein. For example, the machine-readable code 106 may include one or more of one dimensional barcode formats, such as a UPC, code 39, EAN 8, or EAN 13, other two dimensional formats such as PDF417 or Datamatrix, other n-dimensional barcode formats, and/or alphanumeric text or symbols or the like.

After the machine-readable code 106 is scanned by user computing device 102 and/or input into the user computing device 102 and/or the digital wallet 108, the user computing device 102 communicates the data (e.g., the unique coupon program ID 142) to the coupon program computing system 112. The coupon program computing system 112 analyzes the received data, for example, to determine the unique coupon program ID 142, and provisions a digital coupon token 140. The digital coupon token 140 is transmitted to the user computing device 102 and stored thereon, for example, in the digital wallet 108, for later use.

In the exemplary embodiment, when the coupon program computing system 112 receives the data (e.g., the unique coupon program ID 142) from the user computing device 102, it interprets the data as a request for a digital coupon token 140 associated with the unique coupon program ID 142. The coupon program computing system 112 looks up the unique coupon program ID 142 in the database 134. As described herein, the unique coupon program ID 142 is associated with a coupon program or campaign created, for example, by the CPG company 116 and/or the merchant 114. Each coupon program has specific terms and/or conditions associated therewith. For example, a coupon program may include a coupon value, a prepaid purse 128 holding funds for the coupon program, a product SKU (shop-keeping unit) associated with the coupon, a date range specifying when the coupon is valid, restrictions, and the like. The coupon program computing system 112 requests a virtual card number (VCN) from a virtual card app 136 and stores the VCN in the database 134. The coupon program computing system 112 associates the VCN with the unique coupon program ID 142 and the specific terms and/or conditions associated therewith. For example, in the exemplary embodiment, the VCN functions as a prepaid card having a value corresponding to the coupon value specified by the coupon program. In addition, all the terms, conditions, restrictions, etc. specified by the coupon program apply to the VCN.

The coupon program computing system 112 then requests a token service system 138 to tokenize the VCN. In the exemplary embodiment, the interchange network 110 includes the token service system 138, which is configured to generate or assign one or more payment tokens to respective VCNs that are to be tokenized. Tokenization can be initiated, for example, at a point-of-sale (POS) terminal (not shown) of the merchant 114, the user computing device 102, an automated teller machine (ATM), and/or any other transaction processing device. The token service system 138 generates or assigns a payment token to the VCN to be tokenized and creates an association mapping between the token and the VCN. The token service system 138 stores the token-to-VCN mapping data (e.g., in a data mapping table) in a database, such as the database 134. The token service system 138 transmits the token to the user computing device 102, for example, via the POS terminal, such that the token can be used in a payment authorization request. The tokenization process is generally the same whether being performed at a POS terminal, the user computing device 102, an ATM, or any other suitable transaction device.

In the exemplary embodiment, to accept payment from the user 104, for example, via the digital wallet 108 stored on the user computing device 102, the merchant 114 must normally establish an account with a financial institution that is part of the network system 100. This financial institution is usually called the "merchant bank," the "acquiring bank," or the acquirer 118. When the user 104 provides payment for a purchase with the digital wallet 108, the merchant 114 requests authorization from the acquirer 118 for the purchase amount. The request may be performed over the telephone but is usually performed using a POS terminal (not shown) that wirelessly connects to the digital wallet 108 and reads the cardholder's payment account information and communicates electronically with the transaction processing computers of the acquirer 118. Alternatively, the acquirer 118 may authorize a third party to perform transaction processing on its behalf. In this case, the POS terminal will be configured to communicate with the third party. Such a third party is usually called a "merchant processor," an "acquiring processor," or a "third party processor."

In addition, when the user 104 provides one or more digital coupon tokens 140 for a purchase with the digital wallet 108, the merchant 114 requests authorization from the acquirer 118 for the coupon amount. In the exemplary embodiment, the request is performed in the same manner as the request authorization for the purchase amount. That is, the POS terminal (not shown) wirelessly connects to the digital wallet 108 to reads the digital coupon token 140 and communicates electronically with the transaction processing computers of the acquirer 118. Alternatively, the acquirer 118 may authorize a third party (e.g., a merchant processor) to perform transaction processing on its behalf.

Using the interchange network 110, computers of the acquirer 118 or merchant processor communicate with the coupon program computing system 112 to determine whether the digital coupon token 140 is valid and whether the coupon value is covered by the funds held in the prepaid purse 128. For example, the coupon program computing system 112 checks the digital coupon token 140 against the specific terms and/or conditions associated with the unique coupon program ID 142, funds available in the prepaid purse 128, and/or against one or more fraud modelling systems 146 (or fraud models). Based on these determinations, the request for authorization of the coupon token 140 will be declined or accepted. If the request is accepted, an authorization code is issued to the merchant 114.

When a request for authorization of the digital coupon token 140 is accepted, the available funds in the prepaid purse 128 is decreased. In the exemplary embodiment, a charge for the digital coupon token value is posted at the time of the transaction. When the merchant 114 ships or delivers the goods or services, the merchant 114 captures the transaction by, for example, appropriate data entry procedures on the POS terminal 32. This may include bundling of approved transactions daily. If the user 104 cancels a transaction before it is captured, a "void" is generated, and the coupon value may be returned to the prepaid purse 128. If the user 104 returns goods after the transaction has been captured, a "credit" is generated for the purchase and the coupon value is returned to the prepaid purse 128. The coupon program computing system 112 stores the transaction data, such as, and without limitation, the VCN, a merchant identifier, a location where the transaction was completed, the coupon value, a merchant category code, a date and time of the transaction, products purchased and related descriptions or identifiers (e.g., the product SKU), etc., in the database 134.

After a purchase has been made, a clearing process occurs to transfer additional transaction data related to the purchase among the parties to the transaction, such as the acquirer 118, the interchange network 110, the CPG company 116, and the coupon program financial sponsor 124. More specifically, during and/or after the clearing process, additional data, such as a time of purchase, a merchant name, a type of merchant, purchase information, consumer account information, a type of transaction, itinerary information, information regarding the purchased item and/or service, coupon values, and/or other suitable information, is associated with a transaction and transmitted between the parties to the transaction as transaction data, and may be stored by any of the parties to the transaction.

After a transaction is authorized and cleared, the transaction is settled among the merchant 114, the acquirer 118, and the issuer 18. Settlement refers to the transfer of financial data or funds among the merchant 114, the acquirer 118, the CPG company 116, and the coupon program financial sponsor 124. Usually, transactions are captured and accumulated into a "batch," which is settled as a group. More specifically, a transaction is typically settled between the coupon program financial sponsor 124 and the interchange network 110, and then between the interchange network 110 and the acquirer 118, and then between the acquirer 118 and the merchant 114. It should be appreciated that more or less information related to transactions, as part of either authorization, clearance, and/or settlement, may be included in the transaction data and stored within the database 134, at the merchant 114, the acquirer 118, the interchange network 110, the CPG company 116, and/or the coupon program financial sponsor 124. Further, transaction data, unrelated to a particular VCN, may be collected by a variety of techniques, and similarly stored within the database 134.

The embodiments illustrated and described herein as well as embodiments not specifically described herein but within the scope of aspects of the invention constitute exemplary means for converting a traditional coupon into a virtual prepaid payment card number (i.e., a VCN) and provisioning a corresponding digital coupon token 140 into a digital wallet, such as the digital wallet 108. For example, the user computing device 102, the coupon program computing system 112, the payment system 126, or any other similar computer device(s), specially programmed with computer-executable instructions to execute processes and techniques with a processor as described herein, constitute exemplary means for enabling a user, such as the user 104, to scan or otherwise enter a coupon into the user computing device 102 and/or the digital wallet 108 and have a digital coupon token having a specified value transferred to the user's computing device and/or digital wallet card/account.

Exemplary Computer Systems

Figure 2:
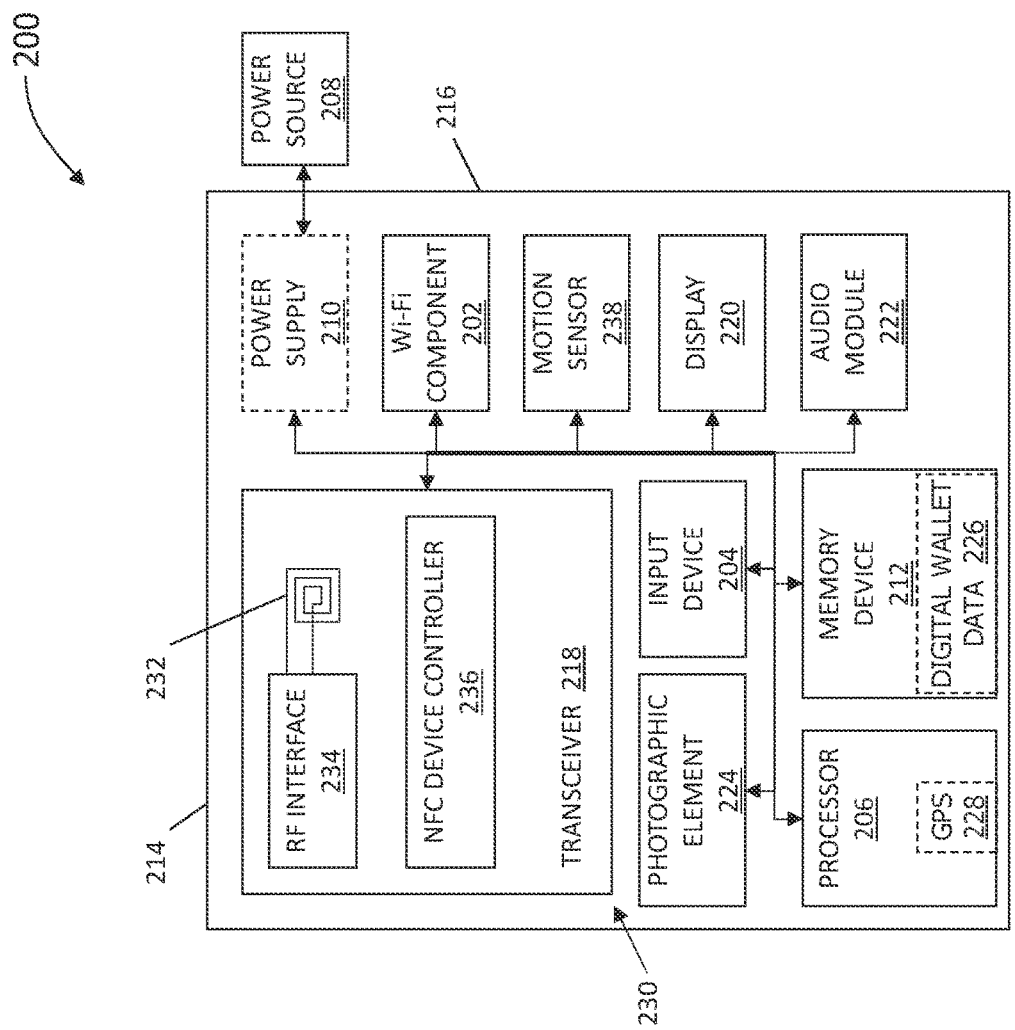
FIG. 2 is an example configuration of the user computing device shown in FIG. 1 that may be operated by a user shown in FIG. 1.

FIG. 2 is an example configuration of a user computing system 200, such as the user computing device 102 (shown in FIG. 1), that may be operated by a user, such as the user 104 (shown in FIG. 1). In the exemplary embodiment, the computing system 200 is a computing device configured to connect to one or more of the coupon program computing system 112, the merchant 114, the CPG company 116, the coupon distributer 120, the network 122, the payment system 126, and any other computing devices, such as other customer mobile computing devices (not shown).

In the exemplary embodiment, the computing system 200 generally includes a processor 206, a memory device 212, a transceiver 218 (or a wireless communication device), and a photographic element 224. In addition, the computing system 200 includes an integrated Wi-Fi component 202 (e.g., implementing the Institute of Electrical and Electronics/ IEEE 802.11 family of standards), an input device 204, a display 220, and an audio module 222. Moreover, the computing system 200 includes an internal power supply 210 (e.g., a battery or other self-contained power source) to receive power, or alternatively, in some embodiments, the computing system 200 may include an external power source 208. Optionally, the computing system 200 may include a motion sensor 238.

The processor 206 includes one or more processing units (e.g., in a multi-core configuration) specially programmed for executing computer readable instructions. The instructions may be executed within a variety of different operating systems (OS) on the user computing device 102, such as UNIX, LINUX, Microsoft Windows®, etc. More specifically, the instructions may cause various data manipulations on data stored in the memory device 212 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.). The memory device 212 is any device allowing information such as digital wallet data 226, the executable instructions, and/or written works to be stored and retrieved. The memory device 212 includes one or more computer readable media.

In the example embodiment, the processor 206 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing system 200 may be widely deployed, it may be impractical to manually update software for each computing system 200. Therefore, the network system 100 provides a mechanism for automatically updating the software on the computing system 200. For example, an updating mechanism may be used to automatically update any number of components and their drivers, both network and non-network components, including system level (OS) software components. In some embodiments, the computing system 200 components are dynamically loadable and unloadable; thus, they may be replaced in operation without having to reboot the OS.

A location of the computing system 200 can be obtained through conventional methods, such as a location service (e.g., global positioning system (GPS) service) in the computing system 200, "ping" data that includes geotemporal data, from cell location register information held by a telecommunications provider to which the computing system 200 is connected, and the like. For example, in one suitable embodiment, an optional GPS chip 228 can be part of or separate from the processor 206 to enable the location of the computing system 200 to be determined.

Stored in the memory device 212 are, for example, computer readable instructions for providing a user interface to the user via the display 220 and, optionally, receiving and processing input from the input device 204. A user interface may include, among other possibilities, a web browser and the digital wallet 108 (shown in FIG. 1). Web browsers enable users, such as the user 104, to display and interact with media and other information typically embedded on a web page or a website. The digital wallet 108 allows the user 104 to interact with the coupon program computing system 112 to convert coupons and/or coupon offers into digital coupon tokens 140 (shown in FIG. 1).

The photographic element 224 may include a camera or other optical sensor and lens combination capable of generating a video signal and capturing an image. In various embodiments, the photographic element 224 may be integrated in a housing or body, such as a housing 214, of the computing system 200. When the photographic element 224 captures an image or otherwise generates image data (e.g., video data), the photographic element 224 may store the image data in a data file, either in a raw or compressed format, in the memory device 212.

In some embodiments, the motion sensor 238 may include one or more sensor elements that facilitate detecting a person's presence. For example, if the computing system 200 is operating as the user computing device 102, the motion sensor 238 detects when the user 104 moves or raises the user computing device 102. Upon detection of such motion, the photographic element 224 may begin capturing images (e.g., still or video images), the transceiver 218 may be activated, and/or the audio module 222 may begin capturing audio. The motion sensor 238 may be operatively coupled to the photographic element 224 such that the person's presence may be detected by detecting motion using the photographic element 224. The motion sensor 238 may include, for example, and without limitation, sensor elements such as a passive infrared sensor, an ambient light sensor, and the like.

In the example embodiment, the display 220 can include, for example, and without limitation, a liquid crystal display (LCD), an organic light emitting diode (OLED) display, or an "electronic ink" display. In some embodiments, a single component such as a touch screen may function as both an output device (e.g., the display 220) and the input device 204. As such, the display 220 may optionally include a touch controller for support of touch capability. In such embodiments, the computing system 200 may detect a person's presence by detecting that the person has touched the display 220 of the computing system 200.

The audio module 222 may include, for example, and without limitation, a speaker and related components capable of broadcasting streaming and/or recorded audio and may also include a microphone. The microphone facilitates capturing audio through the computing system 200.

In the example embodiment, the computing system 200 includes the housing 214 at least partly (and more preferably, at least substantially or entirely) enclosing the components described above. In addition, the computing system 200 includes circuitry 230 configured to communicate with the network 122 (shown in FIG. 1) and/or other computing devices (e.g., other user computing devices, the coupon program computing system 112, the payment system 126, etc.). The circuitry 230 may include, for example, leads, connectors, NFC-enabled circuitry, Wi-Fi-enabled circuitry, and photographic element circuitry. The housing 214 is preferably configured to seal the circuitry 230, which is susceptible to degradation from the ambient environment. In one embodiment, the circuitry 230 is hermetically sealed in the housing 214. For example, in one embodiment, the circuitry 230 is completely and permanently encased within the housing 214. In other words, the housing 214 and the circuitry 230 are intended to remain as a single, inseparable unit throughout the life of the user computing device 102. It is understood that the housing 214 can be formed separately from the circuitry 230 and that the circuitry 230 can be placed into and sealed within the housing 214 in a separate operation. It is also understood that the housing 214 can be oversized with respect to the circuitry 230 so that the circuitry 230 can be placed loosely into the housing 214. In another embodiment, the circuitry 230 can be selectively, sealingly enclosed within the housing 214, where the housing 214 includes a closure 216 removably attached to a body of the housing 214.

The housing 214 is fabricated from a suitably selected material that facilitates inhibiting the effect the material has on the signal being emitted from, for example, the transceiver 218 and/or the Wi-Fi component 202 and passing through the housing material. For example, and without limitation, suitable materials from which the housing 214 may be fabricated include polyethylene, propylene, isoprene, and butylenes (i.e., polyolefins). In other embodiments, the housing 214 is fabricated from any material that enables the computing system 200 to function as described herein, such as metals, etc.

In one embodiment, the transceiver 218 includes an antenna 232. The antenna 232 includes a looped wire configured to transmit radio signals when current flows through the looped wire. The antenna 232 is any size, shape, and configuration that is suitable for transmitting signals as described herein. For example, the antenna 232 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 232 generates a magnetic field when it vibrates at a selected frequency. Specifically, the antenna 232 is configured to vibrate at a frequency of about 13.56 MHz, which is suitable for use in a near field communication (NFC) system.

In the example embodiment, the antenna 232 transmits radio signals to and receives radio signals from other NFC-enabled computing devices, for example, another user computing device, merchant point-of-sale (POS) systems (not shown), and/or any other components used in NFC systems. In NFC systems, at least one NFC component generates a magnetic field to inductively transfer currents and, thereby, exchange signals and information with other NFC components positioned within the magnetic field. In the exemplary embodiment, the antenna 232 functions as an NFC component to send and receive signals. The antenna 232 is configured to transmit radio signals to NFC components positioned within the magnetic field of the antenna 232, such as when the user computing device 102 is located within a predetermined distance of another user computing device 102 and/or a POS system. Therefore, the magnetic field generated by the antenna 232 defines the active range of the computing system 200. Additionally, the antenna 232 receives radio signals from NFC components when the antenna 232 is positioned within the magnetic field of the NFC components.

The transceiver 218 also includes a radio frequency (RF) interface 234 and an NFC device controller 236. The RF interface 234 and the NFC device controller 236 are powered by the power source 208, and in some embodiments, the internal power supply 210 and/or the display 220. In addition, the processor 206 and the memory device 212 are powered in the same manner. The RF interface 234 is configured to receive and transmit RF signals through the antenna 232. The NFC device controller 236 is configured to process the received RF signals and to generate signals to be transmitted by the RF interface 234. The memory device 212 is configured to store data associated with transmitting and receiving the RF signals. The NFC device controller 236 is coupled in communication with the processor 206.

In some embodiments, the computing system 200 may be connected to one or more peripheral devices (not shown). That is, the computing system 200 may communicate various data with one or more peripheral devices. For example, the computing system 200 may communicate with one or more peripheral devices through the Wi-Fi component 202, the transceiver 218, or other suitable means.

Figure 3:
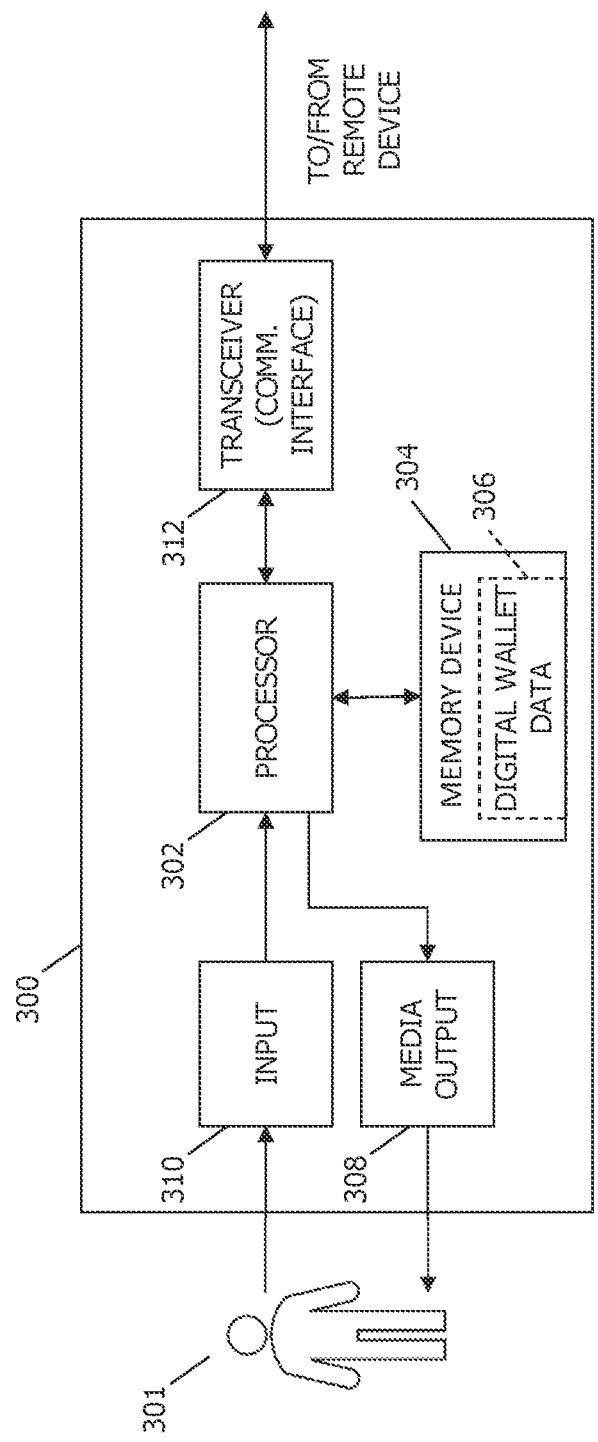
FIG. 3 is an example configuration of a computing system for use in the network system shown in FIG. 1.

FIG. 3 is an example configuration of a computing system 300 operated by a user 301. In some embodiments, the computing system 300 is the coupon program computing system 112 (shown in FIG. 1), and/or the payment system 126 (shown in FIG. 1).

In the example embodiment, the computing system 300 includes one or more processors 302 for executing instructions. In some embodiments, executable instructions are stored in a memory device 304. The processor 302 may include one or more processing units arranged, for example, in a multi-core configuration. The memory device 304 is any device allowing information such as executable instructions, data, and/or written works to be stored and retrieved. The memory device 304 includes one or more computer readable media.

The computing system 300 also includes at least one media output component 308 for presenting information to the user 301. The media output component 308 is any component capable of conveying information to the user 301. In some embodiments, the media output component 308 includes an output adapter such as a video adapter and/or an audio adapter. An output adapter is operatively coupled to the processor 302 and operatively connectable to an output device such as a display device, a liquid crystal display (LCD), organic light emitting diode (OLED) display, or "electronic ink" display, or an audio output device, a speaker, or headphones.

In some embodiments, the computing system 300 includes an input device 310 for receiving input from the user 301. The input device 310 may include, for example, a touch sensitive panel, a touch pad, a touch screen, a stylus, a photographic element or camera, an optical sensor, a gyroscope, an accelerometer, a position detector, a keyboard, a pointing device, a mouse, or an audio input device. A single component such as a touch screen may function as both an output device of the media output component 308 and the input device 310. The computing system 300 may also include a transceiver 312 (broadly, a communication interface), which is communicatively connectable to a remote device such as the user computing device 102 (shown in FIG. 1). The transceiver 312 may include, for example, a wired or wireless network adapter or a wireless data transceiver for use with radio frequency communication, near field communication (NFC), and/or with a mobile phone network, Global System for Mobile communications (GSM), 3G, or other mobile data network, and/or Worldwide Interoperability for Microwave Access (WiMax) and the like.

Stored in the memory device 304 are, for example, computer readable instructions for providing a user interface to the user 301 via the media output component 308 and, optionally, receiving and processing input from the input device 310. A user interface may include, among other possibilities, a web browser and various software applications. Web browsers enable users to display and interact with media and other information typically embedded on a web page or a website. The various software applications allow the user 301 to interact with the computing system 300 to further communicate with the user computing device 102, the payment system 126, etc. to facilitate providing various financial services to the user 104 and, optionally, execute a transaction upon delivery of such services.

Figure 4:
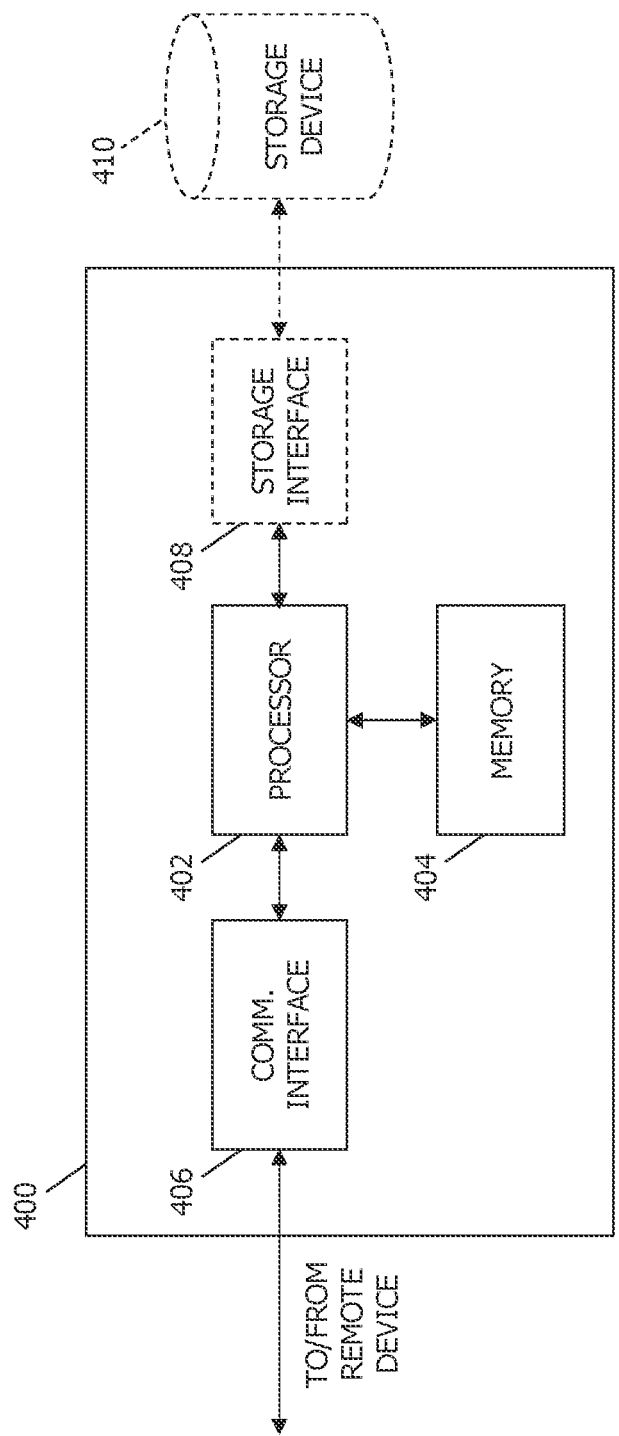
FIG. 4 is an example configuration of a server system for use in the network system shown in FIG. 1.

FIG. 4 is an example configuration of a server system 400, such as the database server 132 (shown in FIG. 1). In the example embodiment, the server system 400 includes a processor 402 for executing instructions. The instructions may be stored in a memory area 404, for example. The processor 402 includes one or more processing units (e.g., in a multi-core configuration) for executing the instructions. The instructions may be executed within a variety of different operating systems on the server system 400, such as UNIX, LINUX, Microsoft Windows®, etc. More specifically, the instructions may cause various data manipulations on data stored in a storage device 410 (e.g., create, read, update, and delete procedures). It should also be appreciated that upon initiation of a computer-based method, various instructions may be executed during initialization. Some operations may be required to perform one or more processes described herein, while other operations may be more general and/or specific to a programming language (e.g., C, C#, C++, Java, or other suitable programming languages, etc.).

The processor 402 is operatively coupled to a communication interface 406 such that the server system 400 can communicate with a remote device such as user computing device 102, a computing system 300, or another server system 400. For example, the communication interface 406 may receive communications from the coupon program computing system 112.

The processor 402 is operatively coupled to the storage device 410. The storage device 410 is any computer-operated hardware suitable for storing and/or retrieving data. In some embodiments, the storage device 410 is integrated in the server system 400. In other embodiments, the storage device 410 is external to the server system 400 and is like the database 134 (shown in FIG. 1). For example, the server system 400 may include one or more hard disk drives as the storage device 410. In other embodiments, the storage device 410 is external to the server system 400 and may be accessed by a plurality of server systems 400. For example, the storage device 410 may include multiple storage units such as hard disks or solid-state disks in a redundant array of inexpensive disks (RAID) configuration. The storage device 410 may include a storage area network (SAN) and/or a network attached storage (NAS) system.

In some embodiments, the processor 402 is operatively coupled to the storage device 410 via a storage interface 408. The storage interface 408 is any component capable of providing the processor 402 with access to the storage device 410. The storage interface 408 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 402 with access to the storage device 410.

The memory area 404 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program.

In some embodiments, it is contemplated that the server system 400 is implemented as a software application. In such embodiments, the hardware described above, such as the processor 402, the memory area 404, the communication interface 406, and/or the storage interface 408 may be shared with the hardware components of a computing system 300, such as the processor 302, the memory device 304, and/or the transceiver 312.

Exemplary Computer-Implemented Methods
Coupon/Coupon Program Creation

Figure 5:
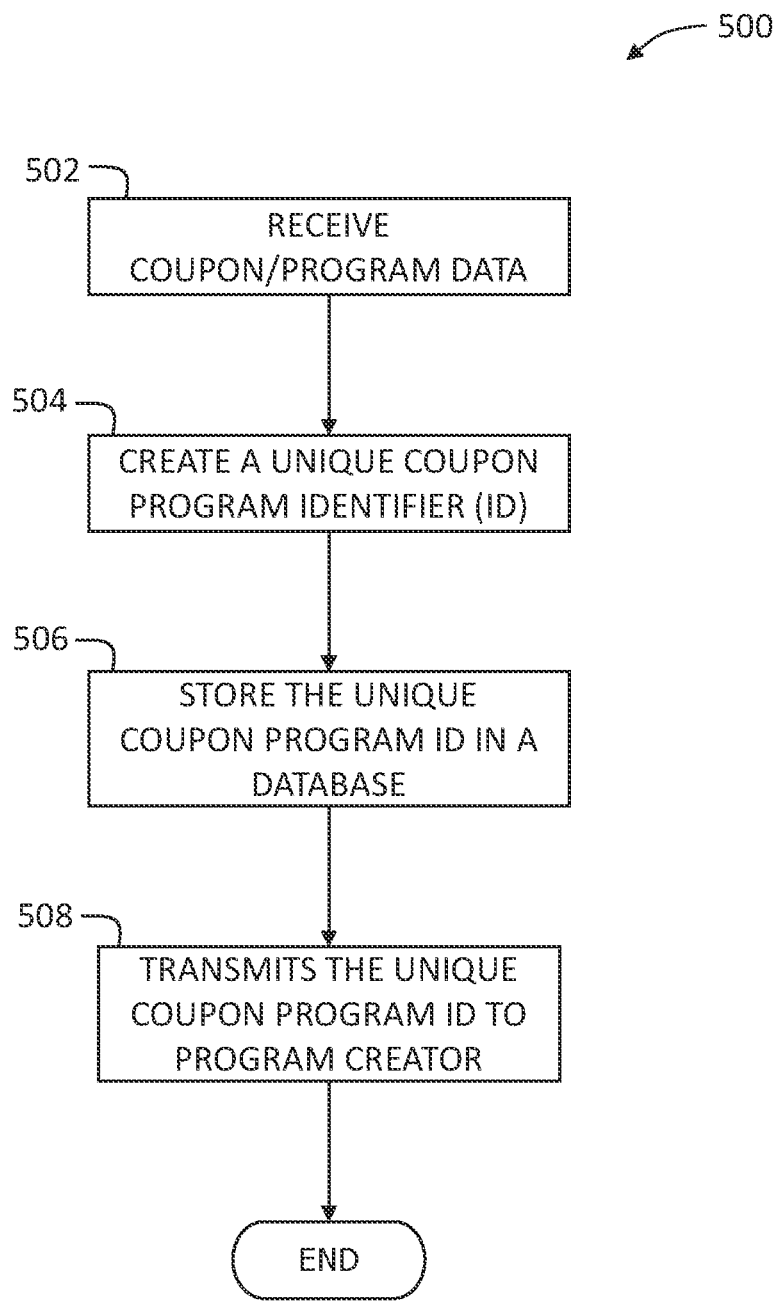
FIG. 5 depicts a flowchart illustrating an exemplary computer-implemented method for creating a coupon and/or a coupon program/campaign using the network system shown in FIG. 1, in accordance with one embodiment of the present disclosure.

FIG. 5 depicts a flowchart illustrating an exemplary computer-implemented method 500 for creating a coupon, such as the coupon 105 (shown in FIG. 1), and/or a coupon program/campaign using the network system 100 (shown in FIG. 1), in accordance with one embodiment of the present disclosure. The operations described herein may be performed in the order shown in FIG. 5 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 500 is described below, for ease of reference, as being executed by exemplary devices and components introduced with the embodiments illustrated in FIGS. 1-4. In one embodiment, the computer-implemented method 500 is implemented by the coupon program computing system 112 (shown in FIG. 1). In the exemplary embodiment, the computer-implemented method 500 relates to registering a coupon and/or coupon program/campaign with the interchange network 110 (shown in FIG. 1). While operations within the computer-implemented method 500 are described below regarding the coupon program computing system 112, according to some aspects of the present invention, the computer-implemented method 500 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

When the CPG company 116 (shown in FIG. 1) or the merchant 114 (shown in FIG. 1) (i.e., a program creator) selects to implement a coupon or coupon program/campaign, it typically defines a budget for the program, partners with one or more coupon distributors, such as the coupon distributor 120 (shown in FIG. 1), and selects a financial sponsor, such as the coupon program financial sponsor 124. In some embodiments, the coupon program financial sponsor 124 is a bank associated with the CPG company 116 or the merchant 114, and the funds for the program are provided by the CPG company 116 or the merchant 114 via the bank. In other embodiments, the coupon program financial sponsor 124 is not associated with the CPG company 116 or the merchant 114, and the funds for the program are provided by the coupon program financial sponsor 124 to the CPG company 116 or the merchant 114, for example, as a line of credit. In some embodiments, the interchange network 110 may facilitate or broker a partnership between the CPG company 116 or the merchant 114, and a coupon program financial sponsor 124.

In the exemplary embodiment, the method 500 includes receiving, from the CPG company 116 (shown in FIG. 1) or a merchant 114 (shown in FIG. 1), coupon data (broadly input data) defining a coupon, such as the coupon 105, and/or coupon program/campaign. In particular, the CPG company 116 or merchant 114 accesses the coupon program computing system 112 (shown in FIG. 1) via the network 122 (shown in FIG. 1) and inputs the data via the coupon program app 130 (shown in FIG. 1). The data includes, for example, predefined terms, conditions, and/or restrictions associated with the coupon and/or coupon program. More particularly, the coupon and/or coupon program includes a client identifier (ID) (e.g., an ID associated with the CPG company 116 or merchant 114), a product identifier (e.g., a product SKU), a date range specifying when the coupon and/or coupon program is valid, an amount for the coupon, and/or any restrictions associated with the coupon or coupon program. Alternatively, the data input by the CPG company 116 or merchant 114 may include any information that enables the coupon program computing system 112 to function as described herein.

At operation 504, the coupon program computing system 112 creates a unique coupon program identifier (ID), such as the second unique coupon program ID 144, which is associated with and identifies the particular coupon or coupon program created by the CPG company 116 or merchant 114. At operation 506, the coupon program computing system 112 stores the second unique coupon program ID 144 in a database, such as the database 134 (shown in FIG. 1), along with the predefined terms, conditions, and/or restrictions associated with the coupon and/or coupon program. For example, the coupon program computing system 112 is a specially programmed computer system that writes data to one or more tables stored in the database 134.

In the exemplary embodiment, at operation 508, the coupon program computing system 112 transmits the second unique coupon program ID 144 to the CPG company 116 or the merchant 114. In one example embodiment, the coupon program computing system 112 encrypts the second unique coupon program ID 144 into a unique cryptogram before it is transmitted. For example, in one embodiment, the unique coupon program ID 144 is hashed under a cryptographic key or keys known only to the coupon program computing system 112. The second unique coupon program ID 144, or in some instances, the unique cryptogram, may be included in a coupon request submitted to the coupon program computing system 112 to identify the coupon or coupon program associated with a coupon request.

Digital Coupon Code Distribution

Figure 6:
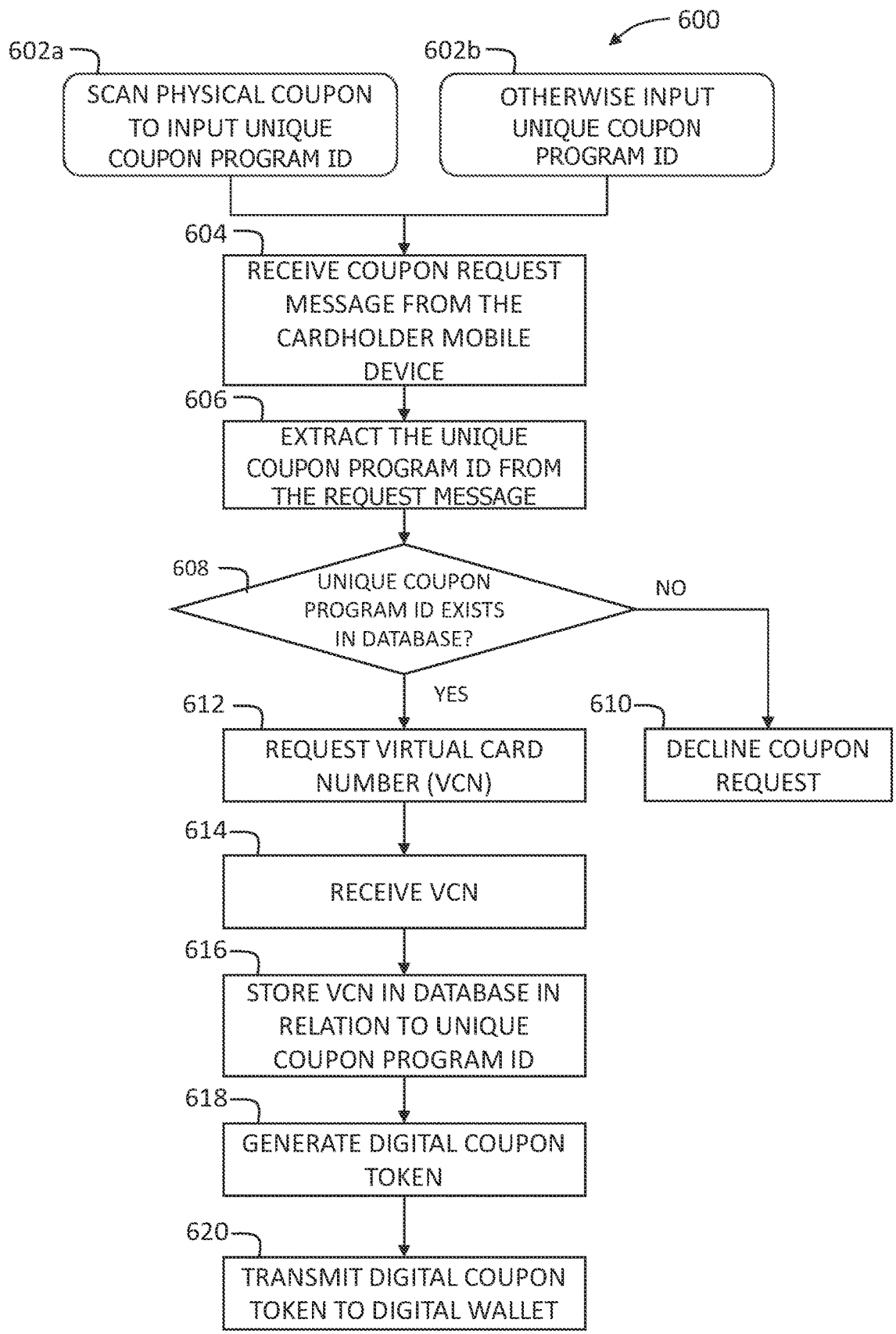
FIG. 6 depicts a flowchart illustrating an exemplary computer-implemented method for tokenizing a traditional coupon using the network system shown in FIG. 1, in accordance with one embodiment of the present disclosure.

FIG. 6 depicts a flowchart illustrating an exemplary computer-implemented method 600 for tokenizing a traditional coupon, such as the coupon 105 (shown in FIG. 1), using the network system 100 (shown in FIG. 1), in accordance with one embodiment of the present disclosure. The operations described herein may be performed in the order shown in FIG. 6 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 600 is described below, for ease of reference, as being executed by exemplary devices and components introduced with the embodiments illustrated in FIGS. 1-4. In one embodiment, the computer-implemented method 600 is implemented by the coupon program computing system 112 (shown in FIG. 1). In the exemplary embodiment, the computer-implemented method 600 relates to provisioning a digital coupon token, such as the digital coupon token 140 (shown in FIG. 1), for a mobile device, such as the user computing device 102 (shown in FIGS. 1 and 2). While operations within the computer-implemented method 600 are described below regarding the coupon program computing system 112, according to some aspects of the present invention, the computer-implemented method 600 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, at operation 602a, the user 104 (shown in FIG. 1) scans a coupon 105 (e.g., a printed or printable coupon, a digital coupon, etc.) including a machine-readable code 106 (shown in FIG. 1), such as a barcode or quick response (QR) code, into the user computing device 102 and/or the digital wallet 108 (shown in FIG. 1) of the user computing device 102. Alternatively, or in addition, at operation 602b, the user 104 inputs coupon data, such as the unique coupon program ID 142, into the user computing device 102 and/or the digital wallet 108. The coupon data may be input, for example, and without limitation, by (i) copying a unique coupon program ID received in an email message, SMS message, etc.; (ii) selecting a coupon/coupon image displayed on the display 220 (shown in FIG. 2) of the user computing device 102; (iii) executing a coupon distributer's app (not shown) and requesting or selecting a coupon contained therein; and/or (iv) transmitting, receiving, or otherwise inputting the unique coupon program ID 142 into the user computing device 102 and/or the digital wallet 108 in any manner that enables the coupon program computing system 112 to function as described herein.

It is noted that the following operations may be performed at any time after operations 602a and/or 602b, but prior to use of the digital coupon token 140 in a transaction. That is, the digital coupon token 140 may be generated substantially immediately upon input of the machine-readable code 106 into the digital wallet 108, or just prior to use of the digital coupon token 140 in a transaction. For example, in certain embodiments, the user computing device 102 and/or the digital wallet 108 may store the machine-readable code 106 until a consumer, such as the user 104, wishes to use the digital coupon token 140 in a transaction. In other embodiments, the digital coupon token 140 is generated and stored in the user computing device 102 and/or the digital wallet 108 until use by the user 104.

At operation 604, the coupon program computing system 112 receives, from the user computing device 102, a coupon request message. In the exemplary embodiment, the coupon request message includes the unique coupon program ID 142 input into the user computing device 102 and/or the digital wallet 108, as described above. At operation 606, the coupon program computing system 112 then extracts details from the coupon request message. Specifically, the coupon program computing system 112 extracts a copy of the unique coupon program ID 142 from the data contained in the coupon request message and temporarily stores it in memory, such as the memory device 304 (shown in FIG. 3).

At operation 608, the coupon program computing system 112 determines whether the unique coupon program ID 142 is registered in the database 134, for example, as a coupon or coupon program. Specifically, the coupon program computing system 112 retrieves the registered coupons and coupon programs from the database 134 and attempts to match the extracted unique coupon program ID 142 to a stored coupon program ID 144 linked to a coupon or coupon program associated with a CPG company 116 or merchant 114 and stored in the database 134. The coupon program computing system 112 maintains a list of unique coupon program IDs associated with the CPG companies and merchants who are registered with the coupon program computing system 112.

If there is no match, the coupon program computing system 112 declines the coupon request at operation 610. If there is a match, at operation 612, the coupon program computing system 112 requests a virtual card number (VCN) from the virtual card app 136 (shown in FIG. 1). Upon receipt of the VCN request from the coupon program computing system 112, the virtual card app 136 provisions a unique VCN, transmits a copy to the coupon program computing system 112 (at operation 614), and stores the VCN (at operation 616) in the database 134. In particular, the stored VCN is associated with, or otherwise related to, the first and second unique coupon program IDs 142 and 144. The stored VCN is further associated with all the terms, conditions, restrictions, etc. specified by the coupon program identified by the second unique coupon program ID 144. For example, the stored VCN is associated with the coupon value stored in the database 134 and thus functions as a prepaid card. However, the VCN is restricted from authorization unless each of the conditions/restrictions are met. For example, for the VCN to be authorized for use, the transaction data in an authorization request must include the product SKU associated with the coupon/coupon program. In addition, the date of any authorization request must fall within any date restrictions associated with the coupon/coupon program.

At operation 618, the token service system 138 generates a digital coupon token, such as the token 140, for the stored VCN. Furthermore, the token service system 138 creates an association mapping between the token and the stored VCN. As described herein, token-to-VCN mapping data (e.g., in a data mapping table) is stored in the database 134. At operation 620, the token service system 138 (e.g., via the coupon program computing system 112) transmits the digital coupon token 140 to the user computing device 102, such that the token 140 can be used in a coupon authorization request.

Digital Coupon Code Redemption

Figure 7:
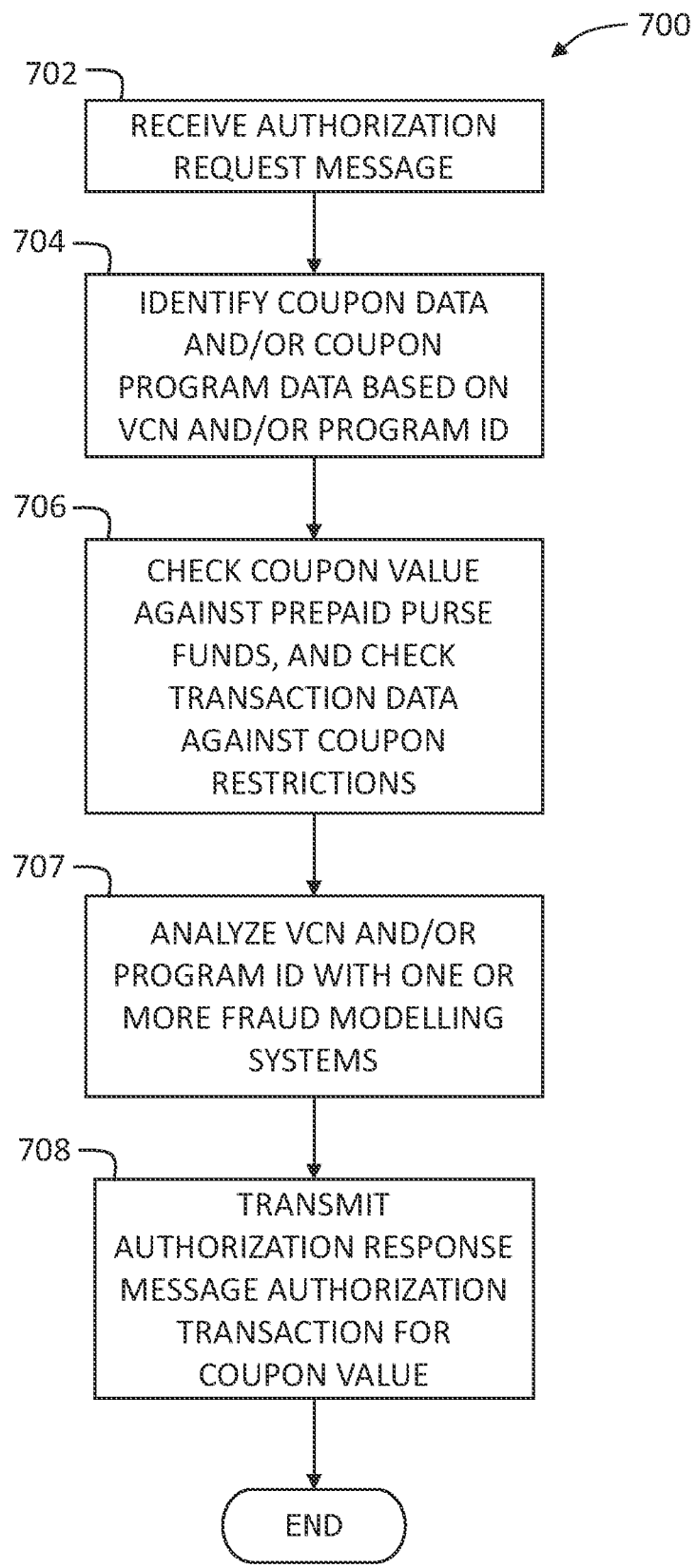
FIG. 7 depicts a flowchart illustrating an exemplary computer-implemented method for redeeming a digital coupon token using the network system shown in FIG. 1, in accordance with one embodiment of the present disclosure.

FIG. 7 depicts a flowchart illustrating an exemplary computer-implemented method 700 for redeeming a digital coupon token, such as the digital coupon token 140 (shown in FIG. 1), using the network system 100 (shown in FIG. 1), in accordance with one embodiment of the present disclosure. The operations described herein may be performed in the order shown in FIG. 7 or, according to certain inventive aspects, may be performed in a different order. Furthermore, some operations may be performed concurrently as opposed to sequentially, and/or some operations may be optional, unless expressly stated otherwise or as may be readily understood by one of ordinary skill in the art.

The computer-implemented method 700 is described below, for ease of reference, as being executed by exemplary devices and components introduced with the embodiments illustrated in FIGS. 1-4. In one embodiment, the computer-implemented method 700 is implemented by the interchange network 110 (shown in FIG. 1). In the exemplary embodiment, the computer-implemented method 700 relates to redeeming a digital coupon token, such as the digital coupon token 140, stored on a mobile device, such as the user computing device 102 (shown in FIGS. 1 and 2). While operations within the computer-implemented method 700 are described below regarding the interchange network 110, according to some aspects of the present invention, the computer-implemented method 700 may be implemented using any other computing devices and/or systems through the utilization of processors, transceivers, hardware, software, firmware, or combinations thereof. A person having ordinary skill will also appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the exemplary embodiment, at operation 702, a coupon authorization request message for redeeming a digital coupon token, such as the digital coupon token 140 is received. In the exemplary embodiment, the coupon authorization request message includes authorization data including at least the digital coupon token 140, date of the transaction, and product SKU data. In some embodiments, the coupon authorization request message includes a coupon identifier, such as the unique coupon program ID 144. In one embodiment, the product SKU data and the unique coupon program ID 144 are encoded in a custom data field in the coupon authorization request message. In the exemplary embodiment, the coupon authorization request message is formatted pursuant to the ISO 8583 standard.

In operation 704, coupon data (e.g., the coupon value, date restrictions, SKU restrictions, etc.) based on the virtual card number (VCN) (which is retrieved from the data mapping table based on the digital coupon token 140) and/or unique coupon program ID 144 is identified in the database 134. The coupon data includes at least a coupon value, a date restriction, and a product SKU restriction. In operation 706, the coupon value is checked against or compared to available funds (broadly, an amount) held in the prepaid purse 128, substantially in real time. In addition, the date of the transaction and the product SKU data is checked against or compared to the date restriction and the product SKU restriction, respectively.

In operation 707, the VCN and/or unique coupon program ID 144 is analyzed by the fraud modelling systems 146 (shown in FIG. 1). For example, in one example embodiment, one or more fraud models (ruled-based and/or AI-based) are applied to the VCN and/or unique coupon program ID 144 identified from the received authorization request message. The fraud models are based, for example, on known fraudulent coupon schemes and behavior-based rules associated with the user computing device 102 (e.g., controls for managing how many coupon tokens can be added to the device, etc.). Based on outcome of the fraud model analysis, the fraud modelling systems 146 determine a fraud score, which may be compared to a predetermined threshold score. If the fraud score is within the threshold score (e.g., below a threshold score), the coupon transaction may be determined to pass the fraud analysis (i.e., the coupon transaction may proceed if other restrictions/terms are met).

In operation 708, if the coupon value is less than the funds available in the prepaid purse, the date restriction and product SKU restriction are met (e.g., the date of the transaction is within the date restriction, and the product SKU data matches the product SKU restriction), and the coupon transaction passes the fraud model analysis, a coupon authorization response message authorizing the coupon transaction for the coupon value is transmitted to the merchant.

It is noted that redemption of the digital coupon token 140, as described in the operations of method 700, can be implemented manually (e.g., by the user 104 selecting the digital coupon token for processing) or automatically (e.g., linking the digital coupon token to a selected transaction card for automatic redemption). In an automatic redemption embodiment, the user 104 links the digital coupon token 140 to one or more selected transaction cards of the user 104 (e.g., a transaction card stored in the digital wallet 108), for example, via a selection option in the digital wallet 108. When the user 104 selects to perform a transaction using a linked transaction card (e.g., via swipe, dip, tap, etc.), the digital coupon token 140 linked thereto is automatically applied. That is, the digital coupon token 140 is processed as described in method 700 above automatically.

The systems and methods described herein provide for tokenizing typical physical coupons and/or electronic coupons to facilitate eliminating fraud. The tokenized, digital coupon is processed as a prepaid, virtual payment card (via token). From a merchant's perspective, the digital coupon token is approved via a partial authorization substantially similar to a typical electronic payment. As described herein, tokenizing coupons, according to the disclosed embodiments, facilitates eliminating or substantially reducing coupon fraud. In addition, the disclosed techniques allow fraud controls/models to be added to coupon redemption because the digital coupon token is authorized in a similar manner as an electronic payment transaction. Furthermore, an advantage of the disclosed systems and methods includes the ability to link digital coupon tokens to one or more predetermined or selected transaction cards for automatic redemption.

Additional Considerations

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium (such as a non-transitory computer-readable storage media) or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor comprises a general-purpose processor configured using software, the general-purpose processor may be configured as respective different processors at different times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a single location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

What is claimed is:

1. A computing system comprising:
  a database;
  a communication interface receiving, from a user computing device, a coupon request message, wherein the coupon request message includes a first unique coupon program ID; and
  one or more processors programmed to perform operations comprising:
    extracting, from the coupon request message, the first unique coupon program ID;
    matching the first unique coupon program ID to a second unique coupon program ID stored in the database;
    generating, by a token service system, a digital coupon token, the digital coupon token being associated with the first and second unique coupon program IDs;
    transmitting the digital coupon token to the user computing device;
    requesting a virtual card number;
    associating the virtual card number with the second unique coupon program ID;
    storing the virtual card number in the database;
    storing token-to-VCN mapping data in a data mapping table in the database;
    receiving, from a merchant computing device, a coupon authorization request message corresponding to a transaction, the coupon authorization request message including authorization data comprising the digital coupon token, a date of the transaction, and product SKU data, the product SKU data corresponding to a product purchased in the transaction;
    retrieving the virtual card number from the data mapping table based on the digital coupon token;
    identifying coupon data in the database based on the virtual card number, the coupon data including a coupon value, a date restriction, and a product SKU restriction;
    determining that the coupon value is less than an amount held in a prepaid purse associated with the digital coupon token, the date of the transaction is within the date restriction, and the product SKU data matches the product SKU restriction; and
    transmitting a coupon authorization response message to the merchant computing device for the coupon value.

2. The computing system in accordance with claim 1, said one or more processors further programmed to perform operations comprising:
  receiving coupon data from a program creator, the coupon data defining one or more of a coupon and a coupon program;
  creating the second unique coupon program ID, the second unique coupon program ID being associated with the coupon data; and
  storing the second unique coupon program ID and the coupon data in the database.

3. The computing system in accordance with claim 2, the coupon data including one or more of the following: terms, conditions, and restrictions.

4. The computing system in accordance with claim 2, said one or more processors further programmed to perform an operation comprising transmitting the second unique coupon program ID to the program creator.

5. The computing system in accordance with claim 4, said one or more processors further programmed to perform an operation comprising encrypting the second unique coupon program ID before transmitting the second unique coupon program ID to the program creator.

6. The computing system in accordance with claim 1, said one or more processors further programmed to perform operations comprising:
  receiving, from a merchant computing device, a coupon authorization request message corresponding to a transaction, the coupon authorization request message including authorization data comprising the second unique coupon program ID, a date of the transaction, and product SKU data, the product SKU data corresponding to a product purchased in the transaction;
  identifying coupon data in the database based on the second unique coupon program ID, the coupon data including a coupon value, a date restriction, and a product SKU restriction;
  determining that the coupon value is less than an amount held in a prepaid purse associated with the digital coupon token, the date of the transaction is within the date restriction, and the product SKU data matches the product SKU restriction; and
  transmitting a coupon authorization response message to the merchant computing device for the coupon value.

7. The computing system in accordance with claim 1, said one or more processors further programmed to perform operations comprising:
  receiving a selection via the user computing device to link the digital coupon token to a transaction card; and
  automatically processing the digital coupon token for a transaction associated with the transaction card.

8. A method comprising the steps of:
  receiving, via a communication interface, a coupon request message from a user computing device, the coupon request message including a first unique coupon program ID;
  extracting, from the coupon request message, the first unique coupon program ID;
  matching the first unique coupon program ID to a second unique coupon program ID stored in a database;
  generating, by a token service system, a digital coupon token, the digital coupon token being associated with the first and second unique coupon program IDs;
  transmitting the digital coupon token to the user computing device;
  requesting a virtual card number;

associating the virtual card number with the second unique coupon program ID;

storing the virtual card number in the database;

storing token-to-VCN mapping data in a data mapping table in the database;

receiving, from a merchant computing device, a coupon authorization request message corresponding to a transaction, the coupon authorization request message including authorization data comprising the digital coupon token, a date of the transaction, and product SKU data, the product SKU data corresponding to a product purchased in the transaction;

retrieving the virtual card number from the data mapping table based on the digital coupon token;

identifying coupon data in the database based on the virtual card number, the coupon data including a coupon value, a date restriction, and a product SKU restriction;

determining that the coupon value is less than an amount held in a prepaid purse associated with the digital coupon token, the date of the transaction is within the date restriction, and the product SKU data matches the product SKU restriction; and transmitting a coupon authorization response message to the merchant computing device for the coupon value.

9. The method in accordance with claim 8 further comprising the steps of:

receiving coupon data from a program creator, the coupon data defining one or more of a coupon and a coupon program;

creating the second unique coupon program ID, the second unique coupon program ID being associated with the coupon data; and storing the second unique coupon program ID and the coupon data in the database.

10. The method in accordance with claim 9, the coupon data including one or more of the following: terms, conditions, and restrictions.

11. The method in accordance with claim 9 further comprising the step of transmitting the second unique coupon program ID to the program creator.

12. The method in accordance with claim 11 further comprising the step of encrypting the second unique coupon program ID before transmitting the second unique coupon program ID to the program creator.

13. The method in accordance with claim 8, further comprising the steps of:

receiving, from a merchant computing device, a coupon authorization request message corresponding to a transaction, the coupon authorization request message including authorization data comprising the second unique coupon program ID, a date of the transaction, and product SKU data, the product SKU data corresponding to a product purchased in the transaction;

identifying coupon data in the database based on the second unique coupon program ID, the coupon data including a coupon value, a date restriction, and a product SKU restriction;

determining that the coupon value is less than an amount held in a prepaid purse associated with the digital coupon token, the date of the transaction is within the date restriction, and the product SKU data matches the product SKU restriction; and transmitting a coupon authorization response message to the merchant for the coupon value.

14. The method in accordance with claim 8, further comprising the steps of:

receiving a selection via the user computing device to link the digital coupon token to a transaction card; and automatically processing the digital coupon token for a transaction associated with the transaction card.

15. One or more non-transitory computer-readable storage media having computer-executable instructions stored thereon, wherein when executed by at least one processor, the computer-executable instructions cause the at least one processor to perform operations comprising:

receiving, via a communication interface, a coupon request message from a user computing device, the coupon request message including a first unique coupon program ID;

extracting, from the coupon request message, the first unique coupon program ID;

matching the first unique coupon program ID to a second unique coupon program ID stored in a database;

generating, by a token service system, a digital coupon token, the digital coupon token being associated with the first and second unique coupon program IDs;

transmitting the digital coupon token to the user computing device;

requesting a virtual card number;

associating the virtual card number with the second unique coupon program ID;

storing the virtual card number in the database;

storing token-to-VCN mapping data in a data mapping table in the database;

receiving, from a merchant computing device, a coupon authorization request message corresponding to a transaction, the coupon authorization request message including authorization data comprising the digital coupon token, a date of the transaction, and product SKU data, the product SKU data corresponding to a product purchased in the transaction;

retrieving the virtual card number from the data mapping table based on the digital coupon token;

identifying coupon data in the database based on the virtual card number, the coupon data including a coupon value, a date restriction, and a product SKU restriction;

determining that the coupon value is less than an amount held in a prepaid purse associated with the digital coupon token, the date of the transaction is within the date restriction, and the product SKU data matches the product SKU restriction; and transmitting a coupon authorization response message to the merchant computing device for the coupon value.

16. The non-transitory computer-readable storage media in accordance with claim 15, the computer-executable instructions cause the at least one processor to perform operations further comprising:

receiving coupon data from a program creator, the coupon data defining one or more of a coupon and a coupon program;

creating the second unique coupon program ID, the second unique coupon program ID being associated with the coupon data; and storing the second unique coupon program ID and the coupon data in the database.

17. The non-transitory computer-readable storage media in accordance with claim 16, the computer-executable instructions cause the at least one processor to perform operations further comprising:

transmitting the second unique coupon program ID to the program creator.

18. The non-transitory computer-readable storage media in accordance with claim 17, the computer-executable instructions cause the at least one processor to perform operations further comprising:

encrypting the second unique coupon program ID before transmitting the second unique coupon program ID to the program creator.

19. The non-transitory computer-readable storage media in accordance with claim 15, the computer-executable instructions cause the at least one processor to perform operations further comprising:

receiving, from a merchant computing device, a coupon authorization request message corresponding to a transaction, the coupon authorization request message including authorization data comprising the second unique coupon program ID, a date of the transaction, and product SKU data, the product SKU data corresponding to a product purchased in the transaction;

identifying coupon data in the database based on the second unique coupon program ID, the coupon data including a coupon value, a date restriction, and a product SKU restriction;

determining that the coupon value is less than an amount held in a prepaid purse associated with the digital coupon token, the date of the transaction is within the date restriction, and the product SKU data matches the product SKU restriction; and transmitting a coupon authorization response message to the merchant for the coupon value.

20. The non-transitory computer-readable storage media in accordance with claim 15, the computer-executable instructions cause the at least one processor to perform operations further comprising:

receiving a selection via the user computing device to link the digital coupon token to a transaction card; and automatically processing the digital coupon token for a transaction associated with the transaction card.

* * * * *